United States Patent
McQueen et al.

(10) Patent No.: US 7,461,790 B2
(45) Date of Patent: Dec. 9, 2008

(54) DATA READER AND METHODS FOR IMAGING TARGETS EXPOSED TO HIGH INTENSITY ILLUMINATION

(75) Inventors: Alexander M. McQueen, Eugene, OR (US); Randy J. Turkal, St. Clairsville, OH (US)

(73) Assignee: Datalogic Scanning, Inc., Eugene, OR (US)

( * ) Notice: Subject to any disclaimer, the term of this patent is extended or adjusted under 35 U.S.C. 154(b) by 0 days.

(21) Appl. No.: 11/692,664

(22) Filed: Mar. 28, 2007

(65) Prior Publication Data

US 2007/0241192 A1   Oct. 18, 2007

Related U.S. Application Data

(60) Provisional application No. 60/744,261, filed on Apr. 4, 2006.

(51) Int. Cl.
G06K 7/14 (2006.01)
(52) U.S. Cl. ................. 235/454; 235/462.14
(58) Field of Classification Search ............. 235/454, 235/462.01, 462.14, 462.29, 462.32, 462.35, 235/462.45, 455, 462
See application file for complete search history.

(56) References Cited

U.S. PATENT DOCUMENTS

| 4,499,595 | A |   | 2/1985  | Masaitis et al. ............... 382/9 |
| 4,538,060 | A |   | 8/1985  | Sakai et al. ................. 235/472 |
| 4,631,588 | A |   | 12/1986 | Barnes et al. ............... 358/149 |
| 5,008,696 | A | * | 4/1991  | Miida et al. ................. 396/104 |
| 5,770,847 | A | * | 6/1998  | Olmstead ............... 235/462.35 |
| 5,814,803 | A |   | 9/1998  | Olmstead et al. ............. 235/462 |
| 6,155,488 | A |   | 12/2000 | Olmstead et al. ............. 235/440 |
| 6,311,895 | B1 |  | 11/2001 | Olmstead et al. ....... 235/462.41 |
| 6,505,778 | B1 |  | 1/2003  | Reddersen et al. ..... 235/462.25 |
| 6,520,415 | B1 | * | 2/2003 | McMaster .............. 235/462.35 |
| 6,708,883 | B2 | * | 3/2004 | Krichever .............. 235/462.01 |
| 2006/0016893 | A1 | * | 1/2006 | Barkan et al. ............... 235/454 |
| 2006/0163355 | A1 |   | 7/2006 | Olmstead et al. ............. 235/454 |

OTHER PUBLICATIONS

Product Data Sheet: Sony 2048-pixel CCD Linear Sensor (B/W) for Single 5V Power Supply Bar-code Reader ILX554B, downloaded from: http://www.datasheetsite.com/datasheet/ILX554, visited May 10, 2007, 13 pps.
User Manual: Avantes Avasort for AvaSpec-102/256/1024/2048 version 6.2 User's Manual, pp. 27-29, (Aug. 2004) downloaded from: http://www.avantes.com, visited May 10, 2007, 7 pps.
Takaya Yasuda et al., Variable-Integration-Time Image Sensor for Wide Dynamic Range, 2003, downloaded from: http://www.us.design-reuse.com/articles/article7411.html, visited May 13, 2007, 11 pps.

* cited by examiner

*Primary Examiner*—Daniel St.Cyr
(74) *Attorney, Agent, or Firm*—Stoel Rives LLP (57) ABSTRACT

A data reader such as for example an imaging reader with a CCD or CMOS imager or the like, that acquires an image of an item to be read. A certain type of sensor has been found to exhibit different outputs depending upon the light intensity level: (1) standard output whereby the sensor outputs a signal corresponding to the image collected and (2) inverted output whereby the sensor outputs an inverted signal when the light intensity highly saturates the sensor. Taking advantage of this inverted output, systems and methods are then employed by the data reader to convert or otherwise re-invert this inverted signal in order to read an optical code that, for example, might otherwise have been above the upper exposure limit of the sensor/reader and thus not decodable.

14 Claims, 4 Drawing Sheets

DATA READER AND METHODS FOR IMAGING TARGETS EXPOSED TO HIGH INTENSITY ILLUMINATION

RELATED APPLICATION DATA

This application claims the benefit under 35 U.S.C. § 119 (e) of U.S. Provisional Patent Application No. 60/744,261 filed Apr. 4, 2006 hereby incorporated by reference.

BACKGROUND

The field of this disclosure relates to imaging and collection devices and in particular to methods and devices for illumination, collection and imaging for optical code reading and other data and image capture devices.

Image capture and other data reading devices are used to read optical codes, acquire data, and capture a variety of images. One common data acquisition device is an optical code reader. Optical codes typically comprise a pattern of dark elements and light spaces. There are various types of optical codes, including 1-D codes (such as UPC and EAN/JAN barcodes) and 2-D codes (such as PDF-417 and Maxicode). For convenience, some embodiments are described herein with reference to capture of 1-D barcodes. However, the embodiments may also be useful for other optical codes and symbols as well as other images such as fingerprint capture, and nothing herein should be construed as limiting this disclosure to optical codes or particular types of codes.

One type of data reader is an imaging reader that employs an imaging device or sensor array, such as a CCD (charge coupled device) or CMOS (complementary metal oxide semiconductor) device. Imaging readers can be configured to read both 1-D and 2-D optical codes, as well as other types of optical codes or symbols and images of other items. When an imaging reader is used to read an optical code, an image of the optical code or portion thereof is focused onto a detector array. Some imaging readers are capable of using ambient light illumination, while other imaging readers employ a light source to illuminate the item being scanned.

It is desirable for optical code scanners to have a wide dynamic range of usable illumination conditions over which they may operate. Typically, imaging optical code scanners are required to work in very low light conditions (such as in a dimly lit warehouse with ambient light intensity on the order of tens of lux) as well as in high light conditions (such as in full sunlight with light intensity over 100,000 lux). A lux is a unit of luminous incidence equal to one lumen per square meter. This large variation in ambient light conditions creates a required dynamic range of 10,000× or more. One possible method of compensating for the large variation of ambient light conditions is to equip the scanner with dynamic apertures or electronically adjustable attenuators. The present inventors have recognized that such compensation mechanisms add cost and complexity to the system and thus it would be desirable to provide a system that is entirely solid state, with no moving parts. The design challenge is to create a simple device with a broad dynamic range, which usually means electronically varying the integration time of the sensor as the primary means of exposure control.

SUMMARY

Methods and devices are disclosed for improving reading of optical codes or other items being imaged, particularly where certain light conditions (e.g. bright sunlight) tend to saturate the sensor array or portions thereof.

In a preferred configuration, the data reader comprises an imaging reader, employing a sensor such as a CCD, that acquires an image of an item to be read. A certain type of sensor has been found to exhibit different outputs depending upon the light intensity level: (1) standard output whereby the sensor outputs a signal corresponding to the image collected and (2) inverted output whereby the sensor outputs an inverted signal when the light intensity highly saturates the sensor. Taking advantage of this inverted output, systems and methods are then employed by the data reader to convert or otherwise re-invert this inverted signal in order to read an optical code (for example) that otherwise would have been above the upper exposure limit of the sensor/reader.

Additional aspects and advantages will be apparent from the following detailed description of preferred embodiments, which proceeds with reference to the accompanying drawings.

DETAILED DESCRIPTION OF PREFERRED EMBODIMENTS

Throughout the specification, reference to "one embodiment," or "an embodiment," or "some embodiments" means that a particular described feature, structure, or characteristic is included in at least one embodiment. Thus appearances of the phrases "in one embodiment," "in an embodiment," or "in some embodiments" in various places throughout this specification are not necessarily all referring to the same embodiment. Furthermore, the described features, structures, characteristics, and methods may be combined in any suitable manner in one or more embodiments. In view of the disclosure herein, those skilled in the art will recognize that the various embodiments can be practiced without one or more of the specific details or with other methods, components, materials, or the like. In other instances, well-known structures, materials, or operations are not shown or not described in detail to avoid obscuring aspects of the embodiments.

Preferred embodiments will now be described with reference to the drawings. To facilitate description, any reference numeral representing an element in one figure will represent the same element in any other figure.

Methods and devices according to the embodiments described are particularly useful for presentation scanners utilizing imaging technology. For conciseness of description, the detector arrays are described as CCD arrays, but other suitable detectors may be implemented such as CMOS.

The present inventors have found that certain sensors exhibit two output modes depending upon the light intensity level namely a first standard mode whereby the sensor outputs a signal corresponding to the image collected and a second inverted mode whereby the sensor outputs an inverted signal when the light intensity highly saturates the sensor. One such sensor is the Model ILX554B CCD linear sensor manufactured by Sony Corporation. The ILX554B model is a 2048 pixel CCD linear sensor, details of which are available from the product data sheet hereby incorporated by reference. According to the product data sheet (at page 3), the ILX554B sensor becomes saturated when exposure reaches about 0.004 lux·sec. This sensor outputs an inverted signal when exposure reaches a highly saturated level on the order of several times (or more) the saturation level.

Figure 1:
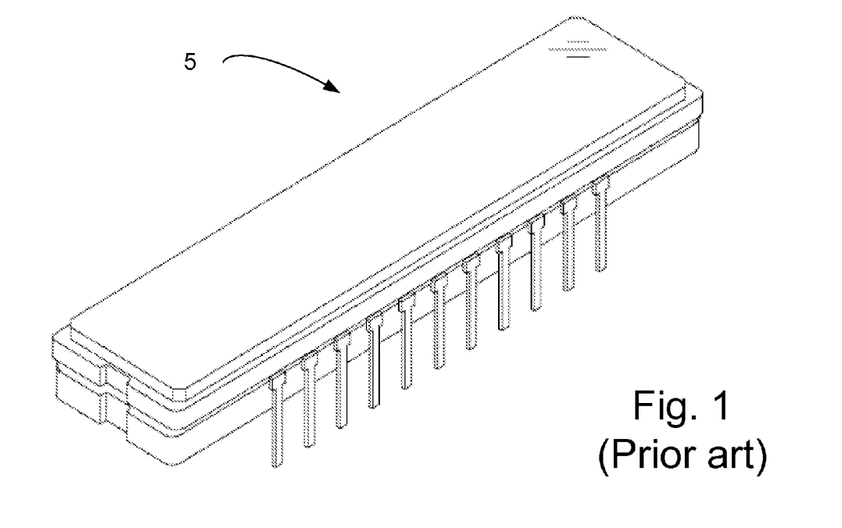
FIG. 1 is a perspective view of a CCD sensor usable in a system and method according to a preferred embodiment.
Figure 2:
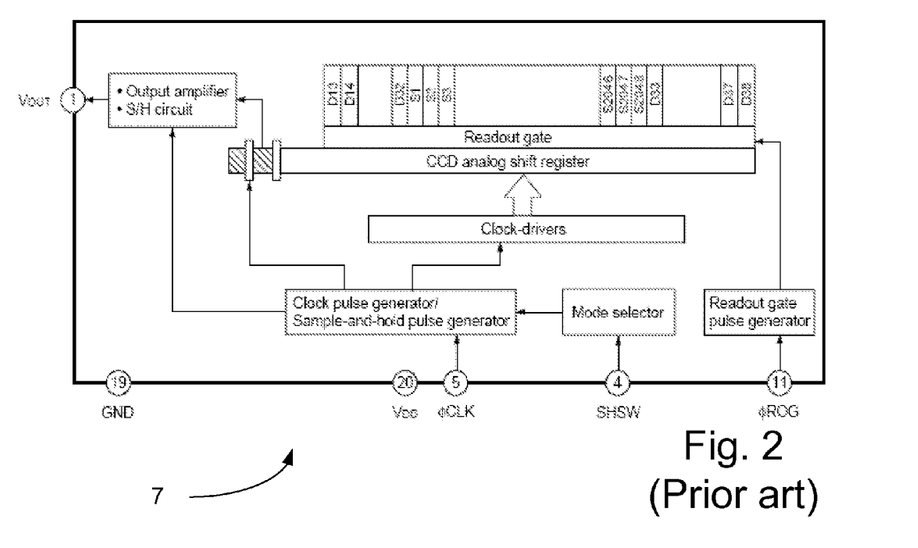
FIG. 2 is a block diagram of the CCD sensor of FIG. 1.

FIG. 1 illustrates the CCD sensor 5 as a 22 pin DIP (dual inline package), with a block diagram 7 of the circuit thereof illustrated in FIG. 2. The CCD sensor 5 includes a linear array of 2048 active pixels, shown in FIG. 2 as elements S1 through S2048. The pixels of this sensor are rectangular having a greater height (on the order of 56 μm) than width (on the order of 14 μm) providing larger pixel area (i.e., greater sensitivity).

Figure 3:
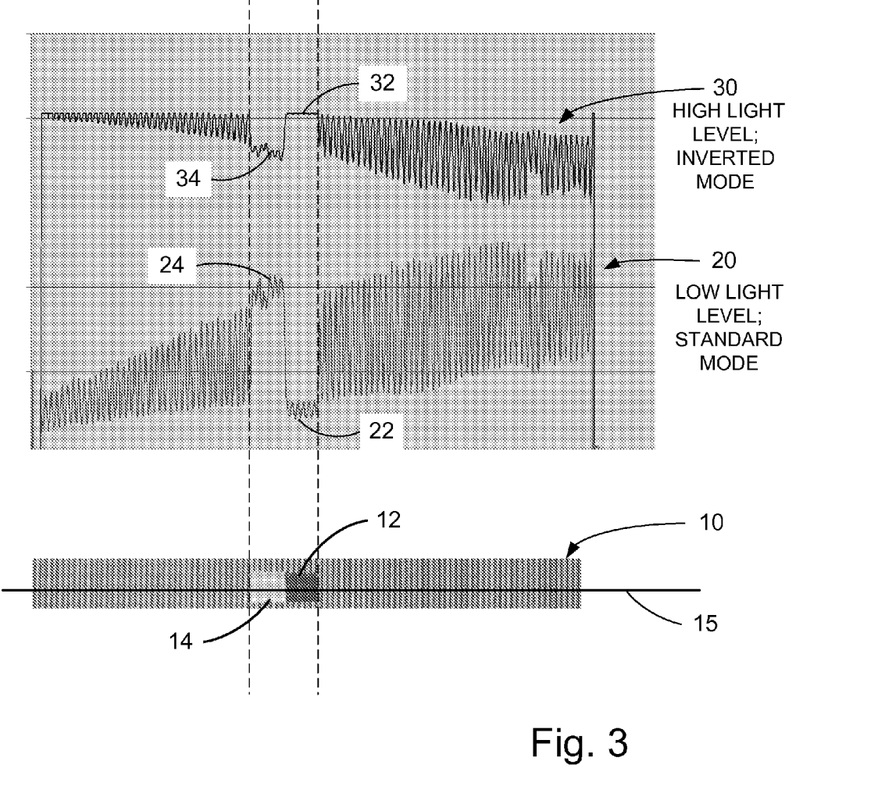
FIG. 3 is a graphical representation of detected signals from a test barcode according to a preferred method.

FIG. 3 is a graphical representation of the output of the linear sensor 5 along a field of view or scan line 15. The lower portion of FIG. 3 illustrates a test target 10 having a central section comprised of light space 12 and dark bar 14 that for test purposes corresponds to the bar and space of a barcode. The top portion of FIG. 3 illustrates two graphical representations of the output of the sensor along scan line 15. Output signal 20 illustrates a low light level where the target 15 is illuminated via ambient light at a moderate light intensity condition, such as on the order of 300 lux. At this ambient light intensity level, the output signal 20 readily distinguishes between an output level 22 corresponding to the bar 12 and an output level 24 of the space 14. Thus this output signal may be sent to a signal processor for decoding. Technically, the output of the model ILX554B CCD is such that the brighter/higher light signal corresponding to the space 14 is a lower voltage and the darker/lower light signal corresponding to the bar 12 is a higher voltage. The curves of signals 20 and 30 shown in FIG. 3 have been inverted by the A/D (analog to digital) converter of the system or elsewhere in the signal processing chain.

The CCD includes the capability of changing exposure. The system includes a control system which controls CCD operation, including light exposure. As the intensity of the ambient light level increases, the system driving the CCD has the capability of compensating for the increasing light by adjusting exposure. If the sensor has an output level that indicates the sensor is exposed to too much light, the control system attempts to electronically reduce exposure time. However in high light conditions such as in direct sunlight, the sensor may reach its minimum exposure time and yet still be saturated. When the sensor is saturated, the output signal is such that the difference between the respective signals corresponding to the bar 12 and space 14 of the optical code cannot be readily distinguished. At a certain very high saturation level, the output signal 30 of CCD is essentially inverted, namely the output level 34 corresponds to the light space 14 and the output level 32 corresponds to the dark bar 12. However, unlike the lower intensity saturation condition where the signals corresponding to the bar and space cannot be distinguished, the high saturation level output signal 30 includes an output level 34 (corresponding to the light space 14) that is distinguishable from the output level 32 (corresponding to the dark bar 12).

The sensor's output or the data representing the output is then re-inverted at some point in the signal processing/decoding chain and the resulting optical code data may then be decoded. In one method, the system automatically determines when the light flux is sufficiently high to result in an inverted signal, and when this condition occurs, the system inverts the data during signal processing (which may be described as "re-inverted") which then produces a decodable signal. The data may be re-inverted by the A/D converter or at any other suitable place in the signal processing/decoding chain In one embodiment, the scanner has two modes of operation, normal (or standard) and inverse (or inverted) video modes. When the scanner is first triggered, it starts in normal video mode and begins trying to set an exposure level that places the video signal within a desired optimum range. During this normal mode, the video signal is treated in the signal processing chain as a non-inverted signal, and all calculations in the processing and decoding algorithms use this assumption. If, after some fixed time or number of captured frames of data, a successful decode has not occurred and it is determined that the sensor (or sensors) is (are) in a high illumination condition (i.e. highly saturated), the system changes to inverted mode, and the data is deliberately re-inverted by the signal processing. The data may be re-inverted by the A/D converter or at any other suitable place in the signal processing/decoding chain. At the same time, the system starts to adjust the exposure longer and longer in order to ensure that the sensor is placed in the highly saturated state. With each lengthening of the exposure, decoding is attempted. If indeed there is sufficient illumination to cause the sensor to output inverted video at one of the exposure selections, then upon re-inversion by the signal processing system, this data should produce a successfully decoded label. If decoding is not successful, the process of continually lengthening the exposure while inverting the data continues until a limit is reached, such as an elapsed time or number of frames since being triggered, or a maximum exposure. At this point, the scanner may revert to normal video mode and the process starts from the beginning as described above. This system and method thus may provide a larger dynamic range.

Figure 4:
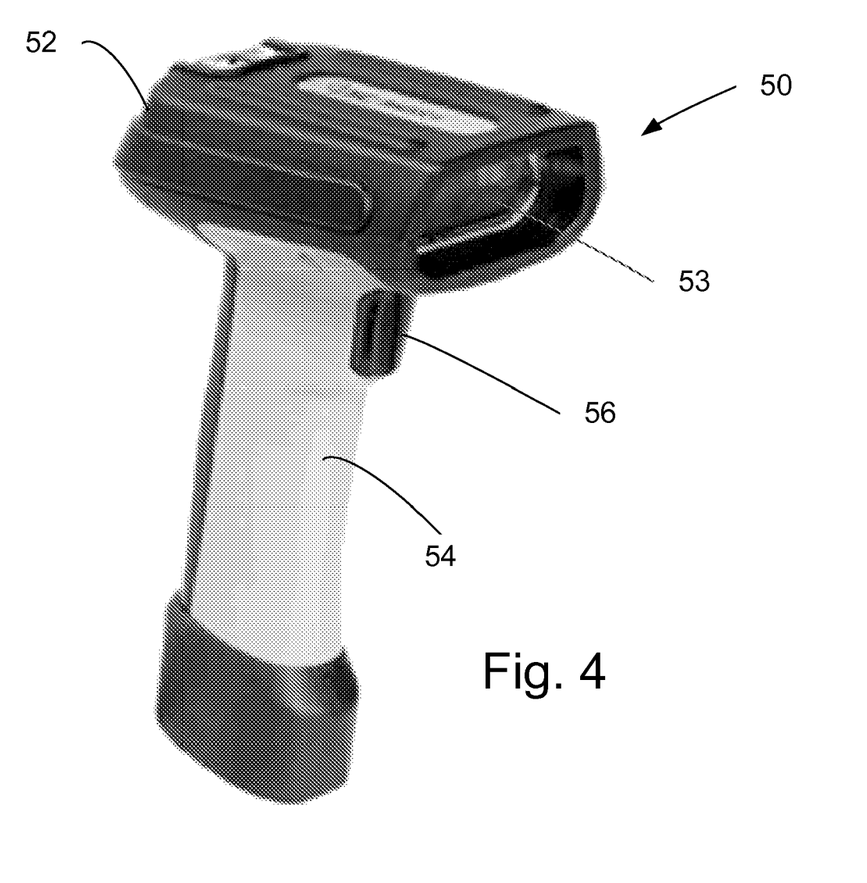
FIG. 4 diagrammatic view of a data reader according to a preferred embodiment.

FIG. 4 illustrates a handheld data reader 50 such as may be equipped with the linear CCD described above. This reader 50 includes a head portion 52 connected to a handle portion 54. A window 53 is disposed in the front section of the head portion 52. This unit 50 is provided with a trigger 56 that is manually actuable to initiate reading operation. Other suitable reader configurations may be employed.

Though this reader may operate solely via ambient light, the reader is preferably equipped with illumination sources that are activated during scanning or during other suitable conditions.

Figure 5:
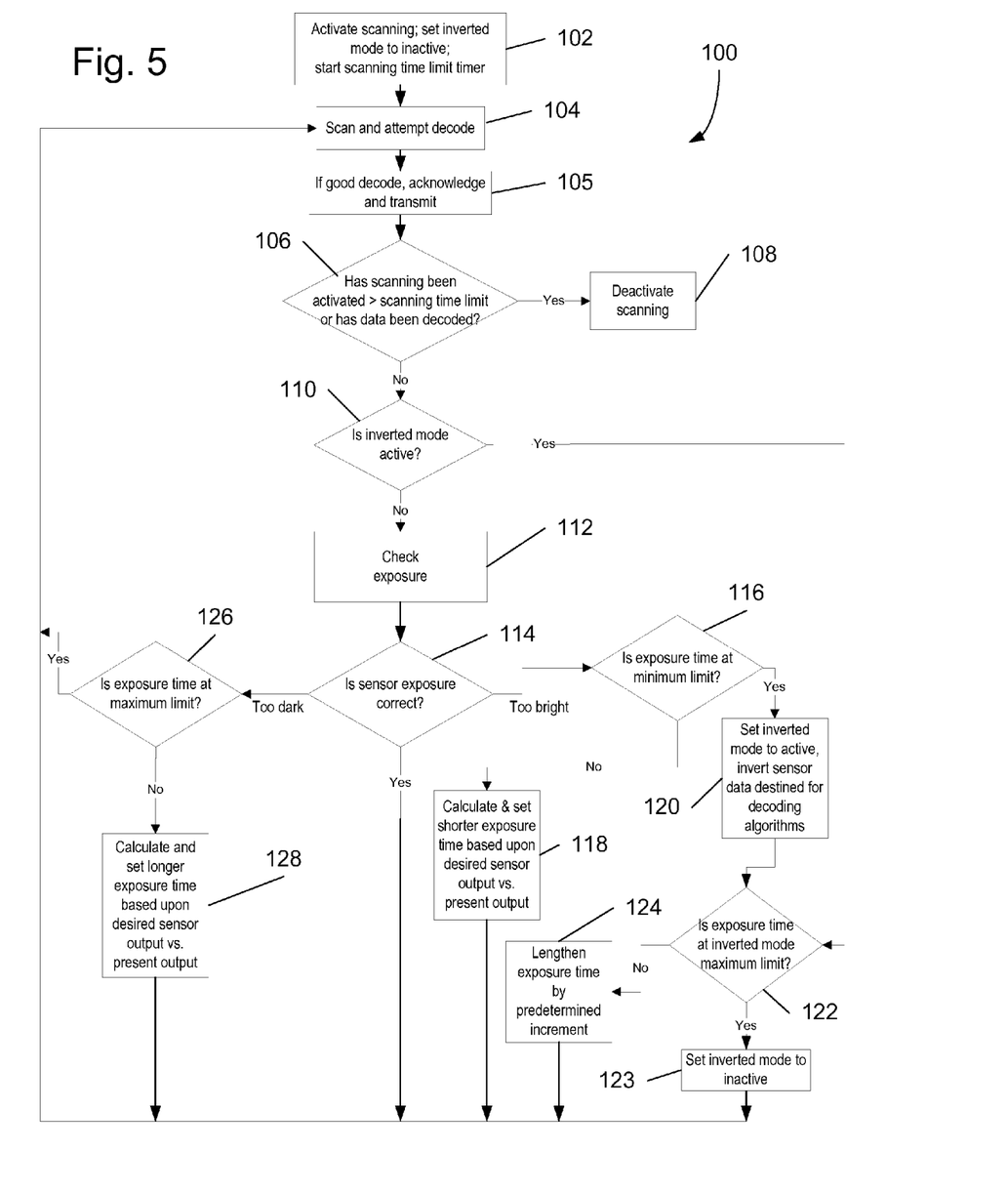
FIG. 5 is a flow chart of a method of data reading according to a preferred embedment.

FIG. 5 is a flow chart illustrating a processing method 100 according to a preferred embodiment. The method includes the steps of:

At Step 102, activating scanning, starting the scanning limit timer, and setting inverted mode to inactive. Preferably, at the start of scanning (e.g. on each trigger pull of the scanner) or after a successful scan, the mode is set to non-inverted, the non-inverted mode being the more standard operating mode.

At Step 104, scanning and attempting to decode.

At Step 105, if good decode is accomplished, acknowledging good read (typically by emitting an audible "beep" tone) and transmitting the data.

At Step 106, determining (1) if scanning has been activated for a time period greater than scanning time limit (e.g. if the scanning limit timer has timed out) or (2) if the data has been decoded, and if yes to either (1) or (2) proceed to Step 108 and deactivate/stop scanning and if no, proceed to Step 110.

At Step 110, determining if inverted mode is activated, if yes, proceed to Step 122, if no proceed to Step 112.

At Step 112, checking sensor exposure and at Step 114 determining if sensor exposure is correct. If exposure is correct, return to Step 104. If exposure is too dark, proceed to Step 126. If exposure is too bright, proceed to Step 116. One method of determining whether exposure is correct is to compare a measured value of the output signal level to a preferred or target range. If the signal level is above the target range, the exposure is too bright. If the signal level is below the target range, the exposure is too dark.

Where the exposure is too dark (meaning there is insufficient light illuminating the optical code), at Step 126 determining whether exposure time is at maximum limit. If yes, returning to Step 104, if no proceeding to Step 128.

At Step 128, setting a longer exposure time. The longer exposure time may be calculated based upon desired sensor output relative to current signal level. Alternately, the exposure time may be increased by a set increment or some other suitable methodology. Once the new (longer) exposure time is set, proceeding to Step 104 to attempt another scan.

If it is determined at Step 114 that the exposure is too light (meaning there is too much light illuminating the optical code), at Step 116 determining if exposure time is at minimum limit. If yes, proceeding to Step 120, if no proceeding to Step 118.

At Step 118 setting a shorter exposure time. The shorter exposure time may be calculated based upon desired sensor output relative to current signal level. Alternately, the exposure time may be decreased by a set increment or some other suitable methodology. Once the new (shorter) exposure time is set, proceeding to Step 104.

If at Step 116 it is determined that the exposure time is already at the minimum time, the exposure level is too bright and there is no further exposure reduction that can be made, the method infers that processing may be successful in the inverted mode. Thus proceeding to Step 120, inverted mode is activated (inverted mode set to active) whereby sensor data is inverted for processing by the decoding algorithms. The method may proceed from Step 120 to Step 122 or alternately, the method may skip Step 122 and proceed either directly to Step 124 or to Step 104.

At Step 122, determining whether exposure time (during inverted mode) is at maximum limit. If yes proceeding to Step 123; if no proceeding to Step 124. The first time through (coming from Step 120), the exposure time is at the minimum limit so the process will determine at Step 122 that the proceed to At Step 124, lengthening (or increasing) exposure time by a given increment and returning to Step 104. The purpose of Step 124 is to incrementally increase exposure and if the exposure was too bright at the minimum exposure setting (in standard, non-inverted mode), the exposure setting is incrementally adjusted upward toward the maximum exposure setting, thereby enhancing conditions for causing the sensor to output inverted video (i.e., in the high saturation level). A preferred increment of exposure lengthening may be on the order of 1 mS. The increment may be larger or smaller. A smaller increment, for example, on the order of 0.5 mS. This preferred increment is fairly small—such a small increment is preferred because it would appear that the inverted-mode operates most successfully in a fairly narrow exposure range.

Though an incremental increase of exposure is a preferred method, other methods of adjusting the exposure may be implemented such as increasing by a calculated amount based on some factor. Alternately, the method may immediately attempt maximum exposure and if not successful, attempt a series of lower exposures.

At Step 123, setting inverted mode to inactive and then proceeding to Step 104. Upon reaching Step 123, the method has cycled through the process having upped the exposure to the maximum. Since decode has been unsuccessful in the inverted mode, the inverted mode is set to inactive and the method then scan attempts decode in standard mode. Step 123 may be omitted as scanning time out at Step 106 would be reached and the system may attempt re-scan at Step 102.

Returning to Step 104 (in the inverted mode from Step 122 or 124), since reading (decoding) was unsuccessful in the standard, non-inverted mode, decoding is again attempted with inverted data. If the CCD achieves the highly saturated state and outputs inverted video, the decoding at Step 106 (with inverted data from Step 120) may prove successful. When operating in the inverted mode, the system then re-inverts the data during processing (for example at the A/D converter or elsewhere in the signal processing chain) in order to produce a decodable signal.

To further explain inverted mode processing, it may be useful to describe typical/standard processing. In optical code reader processing, there is typically a fixed relationship between the voltage level of a signal representing the light and dark areas of a bar code, and the bar code's actual light and dark physical features. For example, at the sensor output, this relationship may be that a more positive voltage represents a brighter area, or, depending upon the sensor, a brighter area may be represented by a lower voltage level. In either case, a typical system will be designed to process the data based upon the known relationship between the sensor's output and the bars and spaces of a barcode, so as to correctly process the encoded data. The same will be true through the digital processing chain of a typical reader. When the analog sensor voltage is converted into a digital or logic level, there will be some fixed relationship maintained between the particular logic level and the actual bar and space data. The decoding algorithms in the reader make use of the fixed, known relationship between the incoming digital data and the original bars and spaces of the encoded information.

In a preferred system/method herein, the relationship between the sensor data levels and the bars and spaces this data is assumed to represent, may take one of two states, depending upon whether or not the sensor is in its highly illuminated, inverted condition. When the sensor is in its normal, non-highly illuminated condition, the voltage levels and their relationship to the bars and spaces of a barcode will have one state, for example, a high voltage level will be treated through the system as indicating a white space in the bar code, and a low voltage level will indicate a black bar. When the system determines that the sensor is in its highly illuminated condition, the system's state will switch to the inverted mode and the relationship between the voltage levels and the barcode features will be inverted by the system. The reversed relationship between voltage and bar code features within the system in this inverted mode is used to compensate for the inverted data issuing from the sensor.

There are several methods by which the system may operate in an inverted processing mode, including: (1) analog hardware such as a single transistor stage, whereby the actual voltage signal is inverted; (2) digital hardware or logic signal inverter; (3) a digital inverter circuit that outputs a voltage representing the opposite logic-level as its input, the inverter circuit serving as the basic logic gate to swap between those two voltage levels; and (4) software. In the software method, the signal may be inverted in software at any suitable stage including at the pre-processing stage or at the decode stage.

In a preferred configuration, the data reader may be provided with multiple sensors. The sensors may be independently controlled or controlled by a common controller. In one preferred method, once the method of controlling one of the sensors is switched to inverted mode (pursuant to Step 120 above), the method of controlling the other sensor is also switched to inverted mode.

In another control scheme, dual sensors are separately controlled and portions combined. Certain methods for processing such a dual sensor system are disclosed in Olmstead et al. U.S. Published Application No. US 2006-0163355 hereby incorporated by reference.

In yet another control scheme, either a second control sensor, or a portion of the primary sensor, may be used to provide informational feedback to the system for exposure control. The control sensor may be designed, such as with a filter or screen, that reduces the overall exposure thereby allowing the control sensor to sense the exposure level at high light levels, i.e., those light levels that normally would create highly saturated or oversaturated levels in sensor 5. The system could then use the output from the control sensor to determine whether the output from the sensor 5 is inverted such as by comparing the output of the control sensor to the output of the sensor 5. If the output from the control sensor indicates a high light level (e.g. a level that would be expected to be highly saturated to the sensor 5) and the output from the sensor 5 otherwise appears to be in the normal range, then it can be inferred with a reasonably high probability that the sensor 5 output is inverted and thus signaling this alternate system/method to switch to inverted mode.

Thus systems and methods for data reading and image capture have been shown and described. It is nevertheless intended that modifications to the disclosed systems and methods may be made by those skilled in the art without departing from the underlying principles of set forth herein.

The invention claimed is:

1. A system for data reading of an item, comprising:
   a sensor arranged to receive a return signal from illumination reflecting from the item and to generate an output signal corresponding thereto, wherein the sensor is operative to generate (a) a first output sianal when the sensor is subjected to illumination below a certain operating range and (b) a second output signal that is inverted relative to the first output signal when the sensor is subjected to high intensity illumination above the certain operating range and becomes highly saturated;
   a processor for processing and decoding the output signal from the sensor, wherein the processor is operative (a) to invert the inverted second output signal and (b) to not invert the first output signal from the sensor.

2. A system according to claim 1 wherein the processor is operative to process an output signal from the sensor (a) in a standard mode when the sensor is subject to illumination within a standard operating range and (b) in an inverted mode when the sensor is subjected to high intensity illumination above a certain operating range and becomes highly saturated and generates an inverted output signal.

3. A system for data reading of an item, comprising:
   a sensor arranged to receive a return signal from illumination reflecting from the item and to generate an output signal corresponding thereto, wherein the sensor is operative to generate an inverted output signal when the sensor is subjected to high intensity illumination above a certain operating range and becomes highly saturated;
   a processor for processing and decoding the output signal from the sensor, wherein the processor is operative to re-invert the inverted output signal from the sensor,
   where in the processor is operative to process an output signal from the sensor (a) in a standard mode when the sensor is subject to illuminatmon within a standard operating range and (b) in an inverted mode when the sensor is subjected to high intensity illumination above a certain operating range and becomes highly saturated and generates an inverted cutput signal,
   wherein the system is operative to highly saturate the sensor by increasing exposure time for enhancing probability of the sensor to generate an inverted output signal.

4. A system according to claim 3 wherein the exposure time is increased incrementally.

5. A method of operating an imaging system including a sensor wherein the sensor is operative to generate an inverted output signal when the sensor is subjected to high intensity illumination above a certain operating range, comprising the steps of
   if exposure on the sensor is too high, adjusting exposure by shortening exposure time;
   if exposure on the sensor is still too high even after exposure time has been adjusted to a minimum, then (a) increasing the exposure time and (b) processing the output signal from the sensor by reinverting the signal.

6. A method according to claim 5 wherein the step of increasing exposure comprises increasing the exposure time incrementally.

7. A method according to claim 6 further comprising
   increasing the exposure time by a 1mS increment,
   processing and attempting to decode in the inverted mode after each increment.

8. A method according to claim 5 further comprising:
   increasing the exposure time until reaching a maximum exposure time;
   upon reaching maximum exposure time without a successful decode, deactivating scanning.

9. A method according to claim 5 further comprising
   activating scanning;
   upon activating scanning, setting processing mode to standard mode;
   scanning and attempting to decode;
   if good decode accomplished, acknowledging good read and transmitting data;
   if good decode not accomplished, determining if scanning has exceeded scanning time limit;
   if scanning has exceeded scanning time limit, deactivating scanning;
   if scanning has not exceeded scanning time limit, determining if processing is in the inverted mode;
   if processing is not in the inverted mode, proceeding to standard mode exposure setting;
   if processing is in the inverted mode: (a) increasing the exposure time and attempting processing and decoding in the inverted mode until reaching a maximum exposure time, and (b) upon reaching maximum exposure time without a successful decode, deactivating scanning.

10. A method of image processing comprising the steps of
    providing a sensor for an imaging system wherein the sensor is operative to generate an inverted output signal when the sensor is subjected to high intensity illumination above a certain operating range;
    upon determining that exposure time has been adjusted to a minimum limit and exposure is still too high,
    (1) switching to an inverted mode wherein data from the sensor is inverted by signal processing,
    (2) incrementally increasing exposure time.

11. A method according to claim 10 wherein the step of incrementally increasing exposure time comprises incrementally increasing exposure by a given increment and re-scanning and attempting decode in the inverted mode.

12. A method according to claim 11 further comprising repeating the steps of incrementally increasing exposure time and re-scanning and attempting decode until a successful decode or until scanning time limit has been reached.

13. A method of image processing comprising the steps of
providing a sensor for an imaging system wherein the sensor is operative to generate (a) a first output sicmal when the sensor is subjected to illumination below a certain operating range and (b) a second output signal that is inverted relative to the first signal when the sensor is subjected to high intensity illumination above a certain operating range;

compensating for the inverted second output signal from the sensor by processing the inverted second output signal in an inverted processing mode.

14. A method of operating an imaging system including a sensor wherein the sensor is operative to generate a standard output signal when the sensor is subjected to illumination intensity in a normal operating range and operative to generate an inverted output signal that is inverted relative to the standard output signal when the sensor is subjected to high intensity illumination above a certain operating range, comprising the steps of processing the standard output signal from the sensor in a standard processing mode;

processing the inverted output signal in an inverted processing mode.

* * * * *

UNITED STATES PATENT AND TRADEMARK OFFICE
CERTIFICATE OF CORRECTION

PATENT NO. : 7,461,790 B2
APPLICATION NO. : 11/692664
DATED : December 9, 2008
INVENTOR(S) : McQueen et al.

It is certified that error appears in the above-identified patent and that said Letters Patent is hereby corrected as shown below:

<u>Column 2</u>
Line 26, before "diagrammatic" insert --is a--.

<u>Column 5</u>
Line 39, after "Step 122 that" insert --exposure time is not a maximum limit and thus--.
Line 40, after "proceed to" insert --Step 124.--.

<u>Column 7</u>
Line 34, change "sianal" to --signal 2--.
Line 61, change "where in" to --wherein--.
Line 63, change "illuminatmon" to --illumination--.
Line 67, change "cutput" to --output--.

<u>Column 8</u>
Line 16, change "reinventing" to --re-inventing--.

<u>Column 9</u>
Line 3, change "sicmal" to --signal--.

Signed and Sealed this

Twenty-third Day of June, 2009

JOHN DOLL
*Acting Director of the United States Patent and Trademark Office*